D. W. INMAN.
COMBINATION PADDLE AND TONGS.
APPLICATION FILED NOV. 29, 1918.
1,308,359.
Patented July 1, 1919.
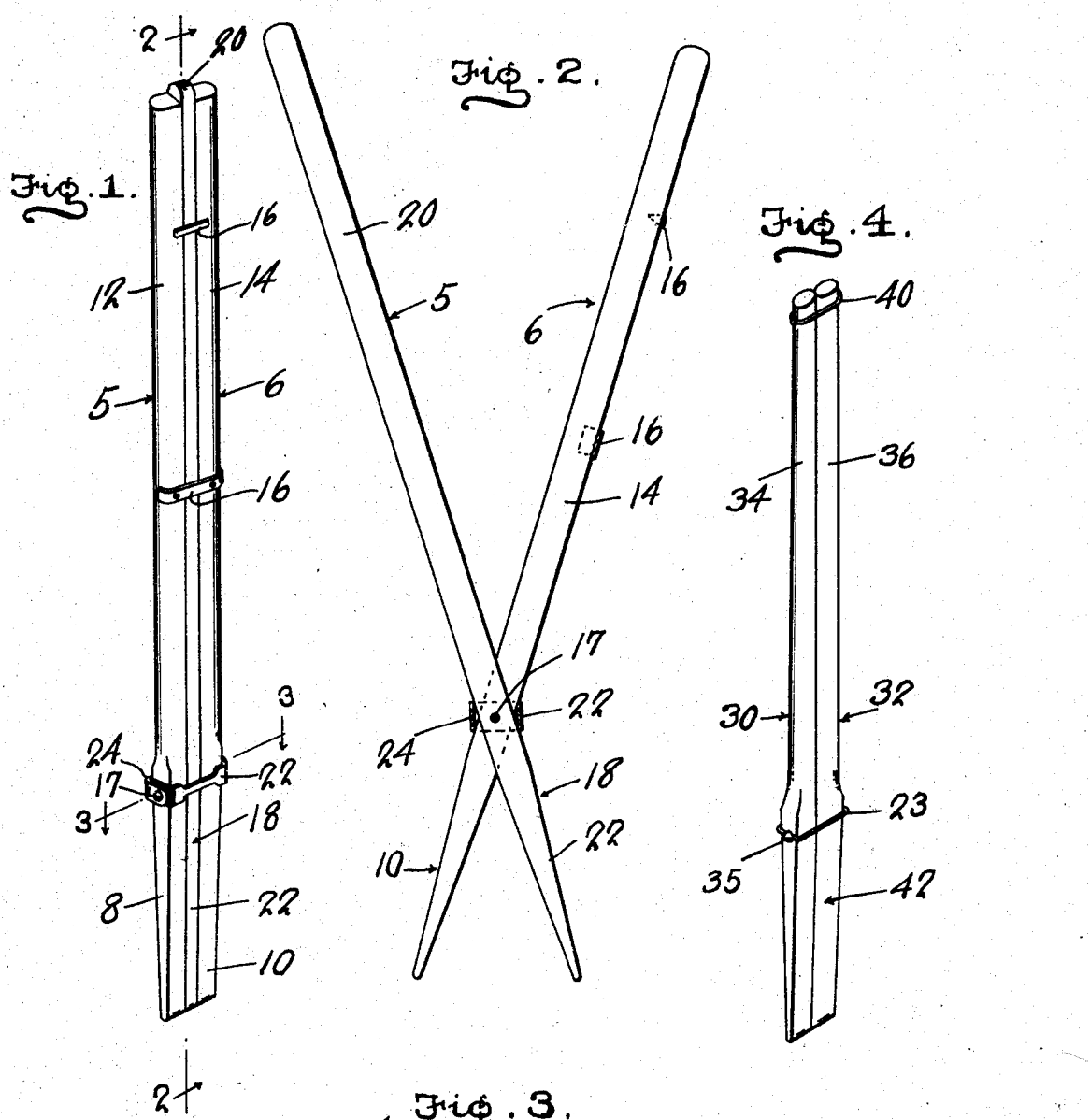
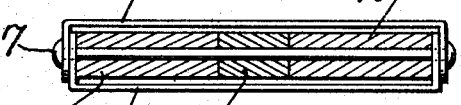

UNITED STATES PATENT OFFICE.

DAVID W. INMAN, OF VERSAILLES, OHIO.

COMBINATION PADDLE AND TONGS.

1,308,359.  Specification of Letters Patent.  Patented July 1, 1919.

Application filed November 29, 1918. Serial No. 264,627.

*To all whom it may concern:*

Be it known that I, DAVID W. INMAN, a citizen of the United States, residing at Versailles, in the county of Darke and State of Ohio, have invented certain new and useful Improvements in Combination Paddles and Tongs, of which the following is a specification.

This invention relates to household specialties and more particularly to a combination paddle and tongs.

The primary object of this invention resides in the provision of a combination paddle and tongs which eliminates the necessity of subjecting the hands of an individual to injury while cooking or washing clothes.

Another object of this invention resides in the provision of a combination paddle and tongs which is adapted to be utilized for lifting kitchen utensils and stirring the food therein.

A still further object of this invention resides in the provision of a combination paddle and tongs which is adapted to be utilized for handling clothes in submerging and withdrawing them from the water in a boiler.

With these and other objects in view this invention resides in certain novel features of construction and arrangement of elements to be more particularly set forth in the specification herewith and pointed out in the appended claims, it being understood that the right is reserved to make such departures from the present disclosure as come within the scope of the claims.

In the accompanying drawing:—

Figure 1 is a perspective view of the combination paddle and tongs;

Fig. 2 is an enlarged sectional view on line 2—2 of Fig. 1, the tongs being shown in open position;

Fig. 3 is an enlarged horizontal sectional view on line 3—3 of Fig. 1;

Fig. 4 is a perspective view of a modified form of this invention.

In the present embodiment of this invention the numerals 5 and 6 designate a pair of tongs which consist of spaced wedge-shaped jaws 8 and 10 from which extend spaced handles 12 and 14, said handles being fixed and held in parallel spaced relation by suitable straps or the like 16.

Hingedly supported between the parallel held tongs 5 and 6 by an intermediately held pivot pin 17 located near one end of said members is a tong member 18 having a handle 20 and jaw 22 similar to the aforesaid handles 12 and 14 and jaws 8 and 10 for coaction therewith in grasping articles to be lifted. These tongs when in closed position are readily adaptable for stirring food while cooking as the combined area of their surface produce a flat paddle.

In order to limit the outward movement of the jaw 22 bridles 24 and 26 are supported by the pin 17 around the jaws 8 and 10 in such manner that certain portions of the jaw 22 will contact therewith upon reaching a predetermined position. As shown in Fig. 1, the straps 16 serve to limit the movement of the tong member 20 in one direction to hold said member in alinement with the tongs 5 and 6 when the tongs are used as a paddle.

In the modified form of this invention as shown in Fig. 4 a pair of tongs 30 and 32 are pivotally secured together by a pin 35 which supports a bridle 23 and have their handles 34 and 36 provided with a keeper 40 for retaining them in closed position so that their flattened ends will form a paddle 42.

With this invention fully set forth it is manifest that a combination paddle and tongs is produced which is cheap of manufacture, readily adapted to perform the functions of its adoption and easily manipulated.

Having thus described my invention what I claim is:—

1. The combination with spaced parallel tongs having wedge-shaped ends, of straps securing said tongs in spaced relation, a tong having a wedge-shaped end secured between said first mentioned tong, a pivotal pin supporting said second mentioned tong between said first mentioned tong and bridles surrounding said tongs.

2. In a device of the character described, two tong members, a pivot supporting said members near one end, an intermediately held tong member located between said first mentioned tong members, and a link holding said first mentioned tong members in parallel spaced relation, and serving as a stop limiting the movement of said intermediately held tong member in one direction, as and in the manner set forth.

In testimony whereof I affix my signature.

DAVID W. INMAN.

Witnesses:
JOHN P. BUBECK.
W. F. FAHNESTOCK.

Copies of this patent may be obtained for five cents each, by addressing the "Commissioner of Patents, Washington, D. C."